United States Patent [19]

Kawashima et al.

[11] Patent Number: 4,655,989
[45] Date of Patent: Apr. 7, 1987

[54] FAST BREEDER

[75] Inventors: Katsuyuki Kawashima, Hitachi; Kotaro Inoue, Tohkai, both of Japan

[73] Assignee: Hitachi, Ltd., Tokyo, Japan

[21] Appl. No.: 382,293

[22] Filed: May 26, 1982

[30] Foreign Application Priority Data

Jun. 2, 1981 [JP] Japan .................................. 56-85180

[51] Int. Cl.$^4$ ............................................... G21C 1/02
[52] U.S. Cl. ..................................... 376/173; 376/333
[58] Field of Search ............... 376/333, 334, 171, 172, 376/173, 349

[56] References Cited

U.S. PATENT DOCUMENTS

| | | | |
|---|---|---|---|
| 3,030,294 | 4/1962 | Beaver et al. | 376/333 |
| 3,140,237 | 7/1964 | Peterson et al. | 376/173 |
| 3,212,982 | 10/1965 | Astley et al. | 376/334 X |
| 3,230,147 | 1/1966 | Hitchcock | 376/333 |
| 3,267,002 | 8/1966 | Fromm, Jr. et al. | 376/333 X |
| 3,271,260 | 9/1966 | Noderer | 376/171 |
| 3,341,426 | 9/1967 | Gratton et al. | 376/350 |
| 3,640,844 | 2/1972 | Shank et al. | 376/349 X |
| 3,658,643 | 4/1972 | Spenke | 376/349 X |
| 3,660,230 | 5/1972 | Bailey, Jr. et al. | 376/334 |
| 3,773,617 | 11/1973 | Marmonier et al. | 376/333 X |
| 4,062,725 | 12/1977 | Bevilacqua et al. | 376/334 |
| 4,152,204 | 5/1979 | Maly et al. | 376/171 |
| 4,451,428 | 5/1984 | Nishimura et al. | 376/333 |
| 4,587,078 | 5/1986 | Azekura et al. | 376/173 |

FOREIGN PATENT DOCUMENTS

| | | | |
|---|---|---|---|
| 2041723 | 2/1971 | France. | |
| 0021077 | 6/1978 | Japan | 376/333 |
| 0022632 | 7/1978 | Japan | 376/333 |
| 0142484 | 11/1979 | Japan | 376/173 |
| 974129 | 11/1964 | United Kingdom | 376/333 |

OTHER PUBLICATIONS

"Fast Reactor Technology: Plant Design", Yevick et al., M.I.T. Press, pp. 600–606, 1966.

Primary Examiner—Deborah L. Kyle
Assistant Examiner—Dan Wasil
Attorney, Agent, or Firm—Antonelli, Terry & Wands

[57] ABSTRACT

A fast breeder which is formed with a driver core region having an enriched nuclear fuel substance and allowing liquid metal acting as a coolant to pass therethrough and with a blanket region surrounding the periphery of the driver core region. A reactor stopping control rod to be inserted downward into the driver core region has an axially uniform density of boron-10. A reactor power adjusting control to be inserted downward into the driver core region has a lower density of boron-10 in a lower region than that in an upper region.

23 Claims, 19 Drawing Figures

FIG. 9
FIG. 8
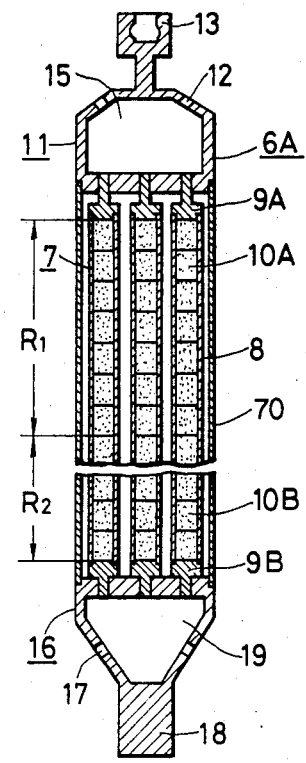
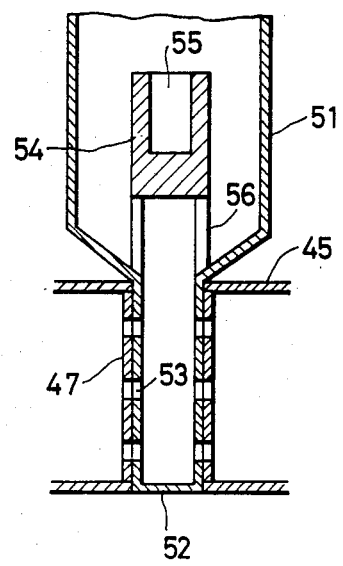

FAST BREEDER

BACKGROUND OF THE INVENTION

The present invention relates to a fast breeder and, more particularly, to a fast breeder which is suitable for reducing the maximum power density in the axial direction of the reactor core.

The fast breeder is a nuclear reactor of the type in which fast neutrons produced as a result of fission in the reactor core are absorbed by a fertile material to produce a new fissile material in the reactor core. Namely, in the fast breeder, the new fissile material is produced at a rate higher than the rate of consumption of the fissile material by fission. It is possible to make an efficient use of the nuclear fuel by this production of the new fissile material, i.e., by the breeding process.

The core of the fast breeder usually has a columnar construction consisting of a driver core region containing the fissile material and a blanket region surrounding the driver core region and consisting mainly of the fertile material. The blanket region has a radial blanket region which surrounds the outer periphery of the driver core region and axial blanket regions which are disposed at both axial ends of the driver core region. The fissile material residing in the driver core region is mainly plutonium 239, while the fertile material in the blanket region consists mainly of uranium 238. This uranium 238 absorbs the fast neutrons produced mainly as a result of the fission of the plutonium 239 and is transformed into plutonium 239.

In the fast breeder, the reactivity is also lost due to consumption of the fissile material after the rated capacity has been achieved. In order to compensate this loss in the reactivity, it has been taken into consideration that the reactivity of the fast breeder at the beginning of burnup is made higher than that during the running operation so that the fast breeder can maintain a predetermined output for a predetermined time period. This reactivity, which has been imparted in advance to the fast breeder so as to maintain the predetermined output, is called "excess reactivity". Control rods to be inserted into the core of the fast breeder control that excess reactivity so as to prevent the nuclear run-away. The control rods of the fast breeder are usually inserted into the reactor core from above.

In order that the energy owned by fuel assemblies loaded in the reactor core may be effectively used, it is necessary to flatten the output distribution as much as possible. In other words, it is required to suppress the maximum power density within a low value.

SUMMARY OF THE INVENTION

It is, therefore, an object of the present invention to suppress the rise in the maximum power density as a result of changes in the insertion depth of control rods.

Another object of the present invention is to lower the maximum power density in the axial direction at a lower portion of the driver core region when the control rods are partially inserted into the driver core region.

A further object of the present invention is to provide a fast breeder which is capable of effecting the scram within a short time period.

In order to achieve those objects, according to a major aspect of the present invention, the neutron absorbing sectional area or cross-section of a lower portion of a control rod to be inserted downward into a driver core region is made smaller than the neutron absorbing sectional area or cross-section of an upper portion of the same.

These and other objects, features and advantages of the present invention will become clear from the following description of the preferred embodiments taken in conjunction with the accompanying drawings.

BRIEF DESCRIPTION OF THE DRAWINGS

FIG. 8 is a vertical sectional view showing the adjusting rod as shown in FIG. 3;

FIG. 9 is a vertical sectional view showing the lower end portion of a lower guide tube as shown in FIG. 3;

DESCRIPTION OF THE PREFERRED EMBODIMENTS

Figure 1:
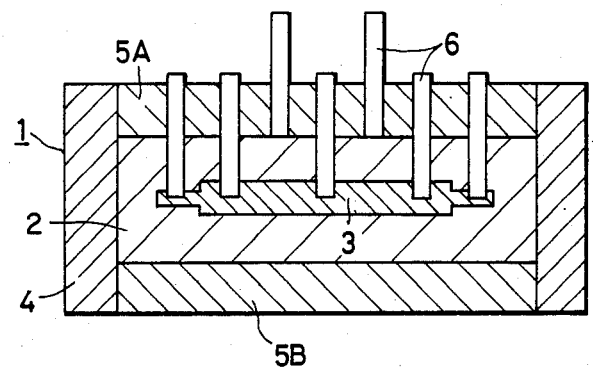
FIG. 1 is a schematic view showing the construction of an axially heterogeneous core of a fast breeder which has already been proposed in a pending U.S. application.

The present invention has been accomplished as a result of detailed examination of the relationship between the insertion depth of control rods in an axially heterogeneous core as shown in FIG. 1 and the maximum power density. The detailed examination made heretofore will be explained in the following.

Figure 2:
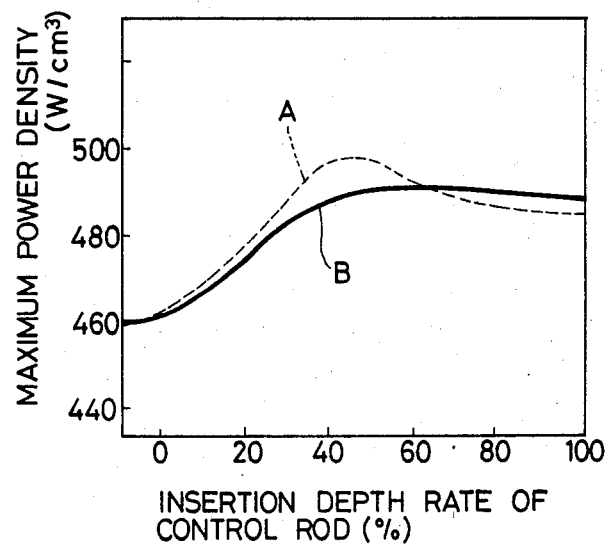
FIG. 2 is a characteristic diagram showing the relationship between the insertion depth ratio of a control rod and the maximum power density.

The axially heterogeneous core 1 as shown in FIG. 1 has already been proposed in U.S. Patent Application Ser. No. 339,894 (which was filed on Jan. 18, 1982), entitled "Fast Breeder". This axially heterogeneous core 1 is constructed of a driver core region 2, an internal blanket region 3 and an external blanket region. The driver core region 2 is surrounded by the external blanket region which is composed of a radial blanket region 4 and axial blanket regions 5A and 5B. The horizontally extending internal blanket region 3 is arranged within the driver core region 2 and at the center in the axial direction. The internal blanket region 3 has its axial thickness made smaller at its peripheral portion than at its central portion in the horizontal direction. More specifically, the internal blanket region 3 has such an axially flattened columnar construction as has its peripheral portion thinned. The driver core region 2 is interposed between the internal blanket region 3 and the radial blanket region 4. Control rods for controlling the excess reactivity to adjust the power of the reactor are inserted downward into the driver core region 2. FIG. 1 shows the state at which the control rods 6 are extracted half way from the driver core region 2 in the axial direction. As is quite natural, the control rods 6 are completely inserted into the driver core region 2 before the start of the fast breeder and are completely extracted from the driver core region 2 at the end of the burnup cycle of the fast breeder before the interchange of fuel assemblies. Each control rod 6 contains boron-10 acting as a neutron absorber in its portion corresponding to the level of the driver core region 2. The axial length of that neutron absorber region is equal to the level of the driver core region 2. The boron-10 is in the form a chemical compound of $B_4C$, and its concentration (e.g., 30 wt. %) is uniform in the axial direction of the control rod 6. The axial change in the maximum power density in the driver core region 2 when that control rod 6 is axially moved within the driver core region 2 all over from the full insertion to the full extraction is shown by a characteristic curve A in FIG. 2. In FIG. 2, the insertion depth ratio of the control rod 6 means the ratio of the axial length of the neutron absorber containing region of the control rod 6 inserted into the driver core region 2 to the level of the driver core region 2. Therefore, the insertion depth ratio of 100% means the full insertion of the control rod, while the insertion depth ratio of 0% means the full extraction. The maximum power density in the driver core region 2 in the axial direction is increased the more, as the insertion depth ratio of the control rod 6 is reduced the more from 100%, until it exhibits the maximum at the insertion depth ratio of about 45%, but is abruptly decreased if the insertion depth ratio is further decreased. The axially maximum power density in the driver core region 2 when the insertion depth ratio is about 45% is higher by about 9% than the maximum power density when the insertion depth ratio is 0%.

We, the inventors, have discovered the phenomenon in which the maximum power density in the axial direction is changed with the insertion depth ratio of the control rod. The present invention has been achieved on the basis of that phenomenon that the increase in the maximum power density of the core as a result of movement of the control rod has been confirmed to be suppressed by changing the neutron absorbing cross-section of the control rod.

One preferred embodiment of the present invention conceived on the basis of the result of the examination thus far described will now be described with reference to FIGS. 3 to 9.

Figure 4:
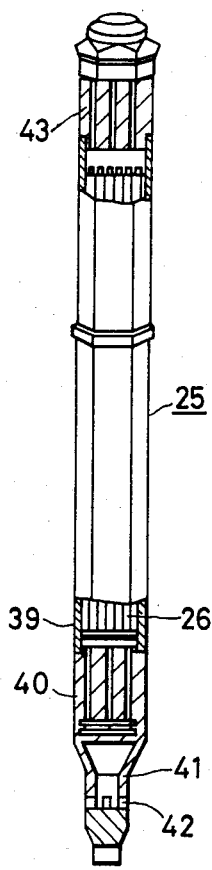
FIG. 4 shows a fuel assembly with which the core as shown in FIG. 3 is loaded.

The fast breeder is equipped with a reactor vessel 21 having its upper end portion sealed with a rotary plug 22, a core composed of a multiplicity of fuel assemblies 25, control rods to be inserted into the core 24, and a core supporting plate 45 attached to the reactor vessel 21 for supporting the fuel assemblies 25. These fuel assemblies 25 are held by inserting an entrance nozzle 41 at the lower end portions of the fuel assemblies 25 into a flow rate adjusting tube 47 which in turn is attached to the core supporting plate 45. The construction of each fuel assembly 25 is shown in FIG. 4. The fuel assembly 25 is constructed by attaching both ends of a bell mouth tube 39 to lower and upper shield members 40 and 43 and by attaching a multiplicity of fuel pins 26 arranged in the bell mouth tube 39 to the lower shield member 40. An entrance nozzle 41 formed with an opening 42, into which Na acting as a coolant flows, is disposed at the lower portion of the lower shield member 40.

The coolant Na which has been cooled by means of an intermediate heat exchanger (although not shown) flows through an inlet nozzle 23A into the lower plenum 48 in the reactor vessel 21. After that, the NA flows through an opening 49 into a high-pressure plenum 46 and is further guided into the fuel assembly 25 through both an opening formed in the flow rate adjusting tube 47 and the opening 42. The Na is heated within the fuel assembly 25 by the fuel pins 26 to an elevated temperature. The resultant hot Na flows though an outlet nozzle 23B out of the reactor vessel 21 until it is returned to the aforementioned intermediate heat exchanger.

Figure 5:
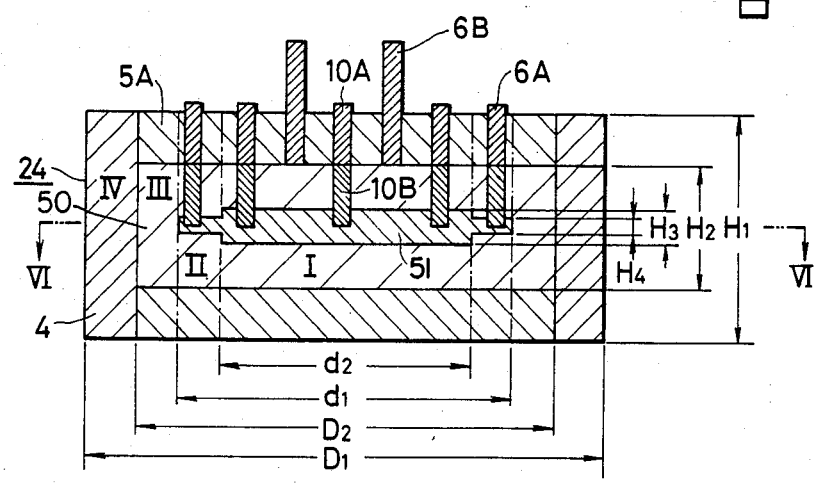
FIG. 5 is a schematic vertical sectional view showing the core as shown in FIG. 3.

The schmatic construction of the core 24 composed of the multiple fuel assemblies 25 is shown in vertical section in FIG. 5. At the axial center of a driver core region 50 which is surrounded by the external blanket region, the radial branket region 4 and the axial branket regions 5A and 5B, there is disposed an internal blanket region 51 which extends in a horizontal direction. The axial thickness of the internal blanket region 51 is changed in two steps. Specifically, the thickness $H_4$ of the internal blanket region 51 at its peripheral portion is made smaller than the thickness $H_3$ at the central portion of the same. The core of the present embodiment is such an axially heterogeneous core as is similar to that of FIG. 1. In the core 24, there are concentrically arranged consecutively of the radial direction: a columnar shaped first layer I which is formed with the internal blanket region; an annular second layer II which is formed with the internal blanket region of the first layer I; an annular third layer III which is not formed with the internal blanket region; and an annular fourth layer IV which is formed with the radial blanket region. The outermost periphery of the internal blanket region 51 faces the radial blanket region 4 while interposing the driver core region 50 inbetween. However, the axial thickness of the internal blanket region of the second layer II in the present embodiment is constant in the radial direction. This may be achieved, as will be described hereinafter, by arranging one kind of fuel assembly in the second layer II. Then, the production of the fuel assemblies is facilitated together with the loading of the same. The internal blanket region of the first layer I is disposed adjacent to the blanket region of the second layer II.

The axially heterogeneous core of the present embodiment is sized such that $D_1=405$ cm; $D_2=325$ cm; $d_1=256$ cm; $d_2=194$ cm; $H_1=175$ cm; $H_2=95$ cm; $H_3=22$ cm; and $H_4=12$ cm.

Figures 7A, 7B, 7C, 7D:
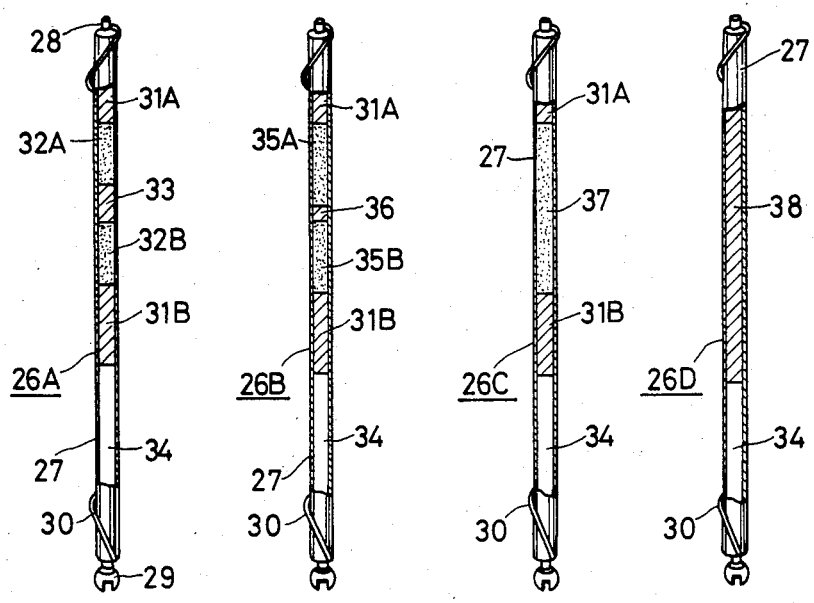
FIG. 7A is a vertical sectional view showing a fuel pin constituting the fuel assembly for loading the first layer I of FIG. 5.
FIG. 7B is a vertical sectional view showing a fuel pin constituting the fuel assembly for loading the second layer II of FIG. 5.
FIG. 7C is a vertical sectional view showing a fuel pin constituting the fuel assembly for loading the third layer III of FIG. 5.
FIG. 7D is a vertical sectional view showing a fuel pin constituting the fuel assembly for loading the fourth layer IV of FIG. 5.

The constructions of the fuel assemblies with which the first, second, third and fourth layers I, II, III, and IV are to be loaded, will now be described with reference to FIGS. 7A to 7B. A fuel assembly 25A with which the first layer I is to be loaded uses a fuel pin 26A as shown in FIG. 7A as the fuel pin 26 in the fuel assembly 25 as shown in FIG. 4. The fuel pin 26A is constructed by loading a clad tube 27, which has both its ends sealed with plugs 28 and 29, with two kinds of fuel pellets, i.e., a core fuel pellet and a blanket fuel pellet. Within the clad tube 27, there are arranged consecutively of the downward direction from the plug 28 an upper blanket region 31A, a driver core region 32A, an internal blanket region 33, a driver core region 32B and a lower blanket region 31B. Below the lower blanket region 31B, there exists a gas plenum 34 for storing a fissile gas which is generated as a result of fission. The upper blanket region 31A, the internal blanket region 33 and the lower blanket region 31B are loaded with blanket fuel pellets which are made of natural uranium containing much uranium 238. The driver core regions 32A and 32B are loaded with core fuel pellets which are made of $PuO_3$—$UO_3$ enriched with plutonium 239. The length from the upper end of the upper blanket region 31A to the lower end of the lower blanket region is 175 cm ($H_1$). A wire spacer 30 is wound on the outer circumference of the clad tube 27.

A fuel assembly 25B with which the second layer II is to be loaded uses a fuel pin 26B as shown in FIG. 7B. This fuel pin 26B has its driver core regions 35A and 35B made longer and its internal blanket region 36 made shorter than those of the fuel pin 26A. By the use of a fuel pin 26C as shown in FIG. 7C, a fuel assembly 25C with which the third layer III is to be loaded is constructed. The fuel pin 26C is constructed by sandwiching between the upper blanket region 31A and the lower blanket region 31B a driver core region 37 which is to be charged with only the core fuel pellet. A fuel pin 26D is formed with a blanket region 38 which is disposed above the gas plenum 34 in the clad tube 27 and which is charged with only the blanket fuel pellet. A fuel assembly 25D with which the fourth layer IV is to be loaded uses the fuel pin 26D. The enrichments of the plutonium 239 in the respective fuel pins at the driver core regions are made equal.

Figure 6:
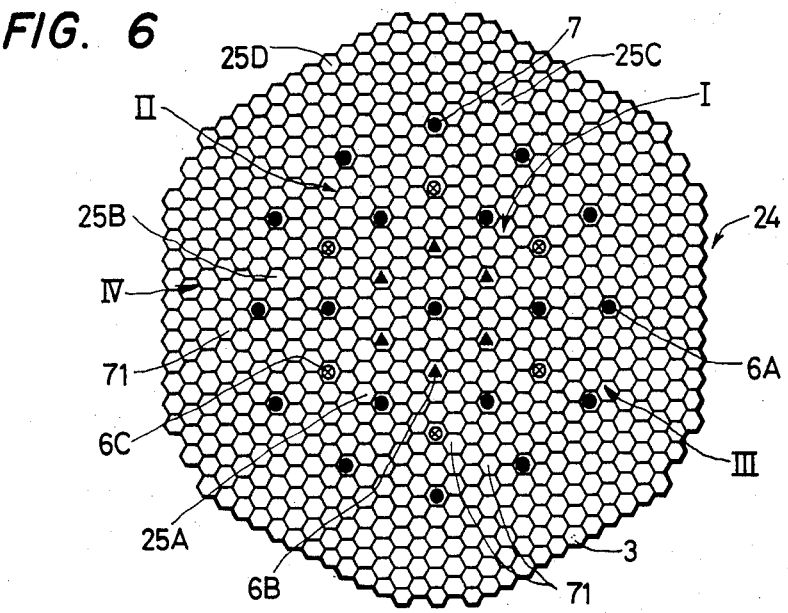
FIG. 6 is a section taken along lines VI—VI of FIGS. 3 and 5.

The control rods are divided into three kinds, i.e., an adjusting rod 6A, a safety rod 6B and a backup safety rod 6C, as shown in FIG. 6. Any of these control rods uses $B_4C$ as a neutron absorber. The adjusting rod 6A controls the reactor power during the running operation of the fast breeder, e.g., compensates the reduction in the reactor power as a result of the fuel consumption. Thus, the adjusting rod 6A is gradually extracted from the driver core region 50 as the run of the fast breeder proceeds. The safety rod 6B is used to stop the run of the fast breeder. Thus, the safety rod 6B is completely extracted from the driver core region 50 simultaneously with the start of the fast breeder and is left extracted from the driver core region 50 during the normal run of the fast breeder. In case the run of the fast breeder is stopped such as in the case of maintenance or inspection of the fast breeder, in the case of fuel interchange or in the case of scram due to an accident, therefore, the safety rod 6B is completely inserted into the driver core region 50. In case the fast breeder is to be stopped, the adjusting rod 6A is also completely inserted into the driver core region 50, although it is quite natural. The backup safety rod 6C has the same function as that of the safety rod 6B. However, the backup safety rod 6C is driven by a drive mechanism completely different from that of the safety rod 6B thereby to back up the safety rod 6B. More specifically, the backup safety rod 6C is inserted into the driver core region 50 in place of the safety rod 6B, when the insertion of the safety rod 6B into the driver core region 50 becomes impossible, thereby to stop the fast breeder. Thus, the safety rod 6B and the backup safety rod 6C can be said to be "the control rods for stopping the reactor". On the contrary, the adjusting rod 6A acts mainly as a control rod for adjusting the power of the reactor, notwithstanding that it retains a function to stop the reactor.

The adjusting rod 6A will now be described with reference to FIG. 8. The adjusting rod 6A is constructed of a plurality of absorber rods 7, an upper tie rod 11 and a lower tie rod 16. The absorber rod 7 is constructed by sealing both ends of a clad tube 8 with plugs 9A and 9B and by charging the clad tube 8 with two kinds of $B_4C$ pellets 10A and 10B. The concentration of the boron-10 in the $B_4C$ pellet 10A is made higher than that of the boron-10 in the $B_4C$ pellet 10B. More specifically, the concentration of the former is 32.5 wt. %, while concentration of the latter is 29.5 wt. %. In other words, the former concentration is about 1.1 times higher than the latter concentration. Here, the concentration of the boron-10 is expressed by the quantity of the boron-10/(the quantity of the boron-10 plus the quantity of boron-11), which is such a substance as do not absorb neutrons. The $B_4C$ pellet 10A is disposed in an upper portion of the adjusting rod 6A, while the $B_4C$ pellet 10B is disposed in a lower portion of the adjusting rod 6A. The level of that neutron absorber charged region in the absorber rod 8, which is charged with the $B_4C$ pellets 10A and 10B, is equal to the level $H_2$ of the driver core region 50. The level of a region $R_1$ charged with the $B_4C$ pellet 10A and the level of a region $R_2$ charged with the $B_4C$ pellet 10B are equal to each other and to one half of the level $H_2$. The concentrations of the boron-10 in the charged regions $R_1$ and $R_2$ are respectively uniform in the axial direction. The absorber rod 8 has both its end portions attached to the upper and lower tie plates 11 and 16. These upper and lower tie plates 11 and 16 are connected by means of the cylindrical cover 70. The absorber rod 8 is fitted within that cylindrical cover 70. The upper tie plate 11 is equipped with a connector portion 13 at its upper end portion, while the lower tie plate 16 is equipped at its lower end portion with a dash ram 18 which in turn constitutes a shock absorber.

Figure 3:
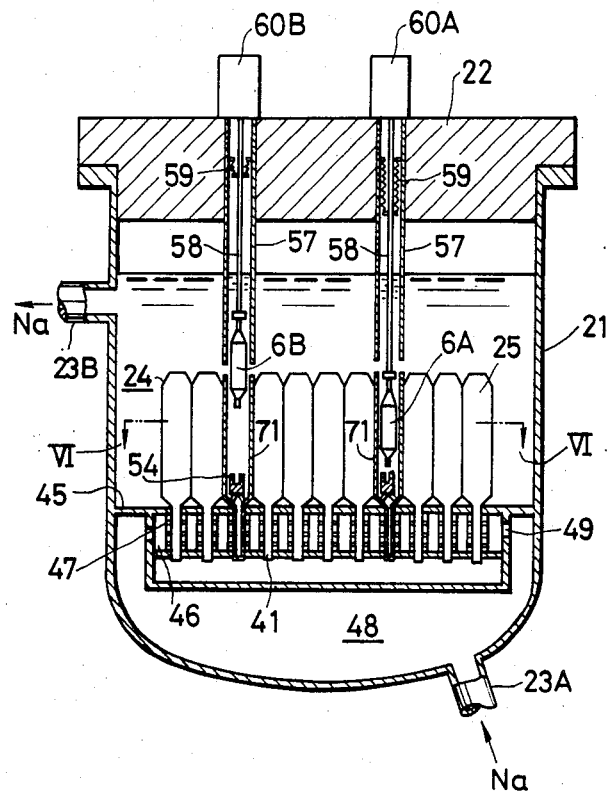
FIG. 3 is a vertical sectional view showing a fast breeder according to one preferred embodiment of the present invention.

A plurality of lower guide tubes 71 having the same shape as the contour of the fuel assemblies 25 are arranged among the fuel assemblies 25 in the core 24. The construction of the lower portion of each lower guide tube 71 is shown in FIG. 9. An entrance nozzle 52 which is disposed at the lower end portion of the lower guide tube 71 is inserted into the flow rate adjusting tube 47 whereby it is supported on the core supporting plate 45. A shock absorber 54 having a dash pot 55 is arranged at the lower end portion in the lower guide tube 71 and is secured to the lower guide tube 71 by means of a supporting member 56. An upper guide tube 57 is arranged on an upper extension of the lower guide tube 71, as shown in FIG. 3. The upper guide tube 57 is secured to the rotary plug 22.

The adjusting rod 6A is made movable within the lower and upper guide tubes 71 and 57. Control rod drivers 60A and 60B are mounted on the rotary plug 22. A drive extending rod 58 extending downward from the control rod driver 60A is removably jointed through the upper guide tube 57 to the connector portion 13 of the adjusting rod 6A. A cylindrical bellows 59 has both its ends attached to the upper guide tube 57 and the drive extending rod 58. The cylindrical bellows 59 thus attached blocks the upward movement of sodium vapors which would otherwise rise within the upper guide tube 57.

The safety rod 6B and the backup safety rod 6C are made to have the same construction as that of the aforementioned adjusting rod 6A excepting the $B_4C$ pellet filled in the absorber rod 8. Although the concentration of the boron-10 in the adjusting rod 6A is varied in the axial direction, as has been described hereinbefore, the concentrations of the boron-10 in the safety rod 6B and the backup rod 6C are uniform in the axial direction. The concentration of the boron-10 in the safety rod 6B and the backup safety rod 6C is 31 wt. %. The safety rod 6B and the backup safety rod 6C are also made movable within the lower guide tube 71 and the upper guide tube 57. The safety rod 6B is removably jointed to the drive extending rod 58 which extends downward from the control rod driver 60B. The control rod drivers 60A and 60B are driven by a motor (although not shown) to move the drive extending rods 58 up and down, respectively. The control rod driver 60A is driven not only upon the start or stop of the fast breeder but also upon the power adjustment during the running operation. On the contrary, the control rod driver 60B is driven both upon the start and stop of the fast breeder but not upon the power adjustment during the running operation. On the other hand, the backup safety rod 6C is driven up and down by the action of a mechanism different from the control rod driver 60B, for example, by a hydraulic pressure.

All the safety rods 6B and the backup safety rods 6C that have been inserted upon the start of the fast breeder are completely extracted upward from the driver core region 50. When the adjusting rods 6A are completely inserted into the driver core region 50, namely, when the dash rams 18 are completely inserted into the dash pots 55, the neutron absorber charged regions ($R_1$ and $R_2$) of the adjusting rod 6A are at the same level as that of the driver core region 50. The adjusting rods 6A are gradually extracted upward from the driver core region 50 so as to increase the power of the reactor. FIG. 5 shows the state at which the adjusting rods 6A are extracted halfway out of the driver core region 50. The sodium Na in a high-pressure plenum 46 flows into the entrance nozzle 52 by way of both the opening formed in the flow rate adjusting tube 47 and an opening 53. This sodium Na passes through the supporting member 56 to rise in the lower guide tube 71. The Na reaches both the internal space 19 in the lower tie plate 16 via an opening 17 and the internal space 15 in the upper tie plate 11 via passages formed among the absorber rods 8 until it flows out of an opening 12. Thus the absorber rods 18 are cooled down by means of the Na flow.

Figure 10:
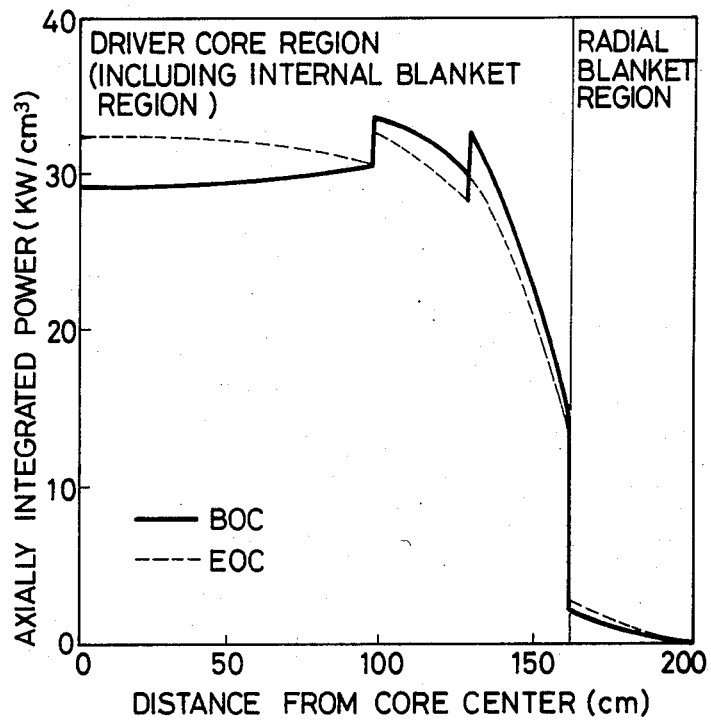
FIG. 10 is a characteristic diagram showing the radial power distribution in the reactor core.
Figure 11:
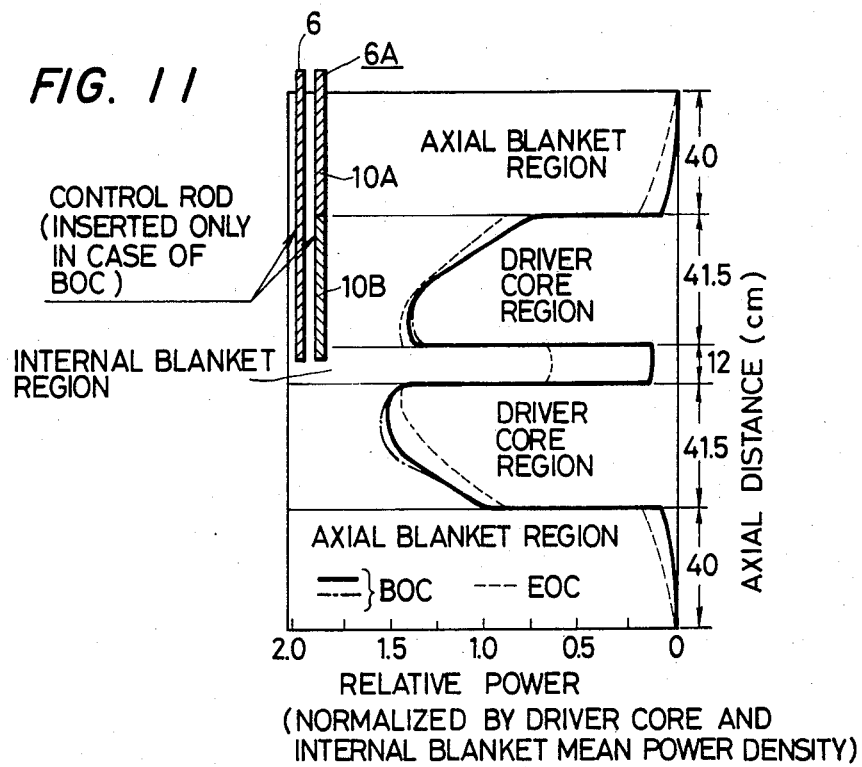
FIG. 11 is a characteristic diagram showing the axial power distribution in the core.

FIG. 5 shows the state of the beginning of burnup cycle (which will be shortly referred to as "BOC"). After that the adjusting rods 6A are gradually extracted from the driver core region 50. The burnup cycle is herein defined by the time period from the loading (or interchanging) operation of the fuel assemblies to the subsequent interchanging operation. The radial and axial power distributions in the core 24 at the BOC and at the end of burnup cycle (which will also be shortly referred to as "EOC") are shown in FIGS. 10 and 11. These power distributions are for a fast breeder having an electric power of 2500 MW. The radial power distribution as shown in FIG. 10 are slightly different between the case, in which the adjusting rod 6A having an axially different concentration of the boron-10 is used as in the present embodiment, and in which the control rod 6 having an axially uniform concentration of the boron-10 is used. Incidentally, the boron-10 concentration of the control rod 6 is 31 wt. %. On the contrary, as shown in FIG. 11, the axial power distributions of the two are changed at the BOC, i.e., when the adjusting rods 6A are extracted halfway from the driver core region 50, as shown in FIG. 5. At the EOC, however, the axial power distributions of the two are identical. Solid curves indicate the distributions of the present embodiment (in which the boron-10 concentration is different in the axial direction of the adjusting rod), and single-dotted curves indicate the example of FIG. 1 (in which the boron-10 concentration is uniform in the axial direction of the adjusting rod). The adjusting rod 6A has a lower boron-10 concentration at its lower portion than that of the control (or adjusting) rod 6 but has a higher boron-10 concentration at its upper portion than that of the control rod 6. As a result, the control rod reactivity value when the adjusting rod 6A is fully inserted is the same as that of the control rod 6. If compared at the BOC, the maximum power density of the driver core region 50 of the present embodiment in the axial direction is reduced by about 1.5% (in a relative value) from that of the example as shown in FIG. 1. This is caused by the fact that the concentration of the neutron absorber at the lower portion (i.e., at the side of the end portion to be inserted) of the adjusting rod 6A is reduced. More specifically, if the adjusting rod 6A is extracted one half in the axially upward direction from the driver core region 50, its lower portion having a lower neutron absorber concentration is positioned at the portion of the driver core region 50 above the internal blanket region 41. As a result, the power distribution of that upper portion of the driver core region 50, which was suppressed in the control rod 6, is increased by the use of the adjusting rod 6A. In order to prevent the reactor power from exceeding a predetermined running power, the number of the insertion depth of the adjusting rods 6A to be inserted into the driver core region 50 are adjusted. As a result, the maximum power density is relatively reduced in the present embodiment, as has been described hereinbefore.

The reason why a power peak occurs at the lower portion of the driver core region, as shown in FIG. 11, when the adjusting rods are inserted halfway into the driver core region of the axially heterogeneous core as shown in FIG. 5 will be described in the following. The axially heterogenous core is formed with an internal blanket region, which contains natural uranium, at its center portion in which the power takes its maximum. The range distance of the neutrons in sodium is longer than that in water such as in a soft water reactor. However, the neutrons produced in the lower portion of the driver core region are absorbed by the internal blanket region so that they fail to reach the upper portion of the driver core region. As a result, the distorsion of the power distribution in the upper portion of the driver core region by the control rods is not compensated by the neutrons which are produced in the lower portion of the driver core region. This phenomenon does not takes place in the axially homogeneous core so that the neutrons produced in the lower portion of the driver core region will reach the upper portion of the driver core region without any difficulty. As a result, that distorsion of the power distribution in the upper portion of the driver core region, which is caused by the control rods (or the adjusting rods) is corrected to some extent by the neutrons which come from the lower portion. The axial power distribution in the axially homogeneous core when the control rods are inserted one half in the axial direction raises no distorsion, as is different from the axially heterogenous core as shown in FIG. 11, but becomes so smooth as resembles a cosine-shaped distribution. The absolute value of the maximum power density in the axial distribution is far lower at the axially heterogenous core having the internal branket region than at the axially homogenous core. Incidentally, the radial and axial power distributions in the core 24 of the present embodiment as shown in FIG. 5 are remarkably flattened. Thus, the fast breeder having the core 24 has a breeding coefficient of 1.29 and a doubling time of 16.6 years.

Figure 12:
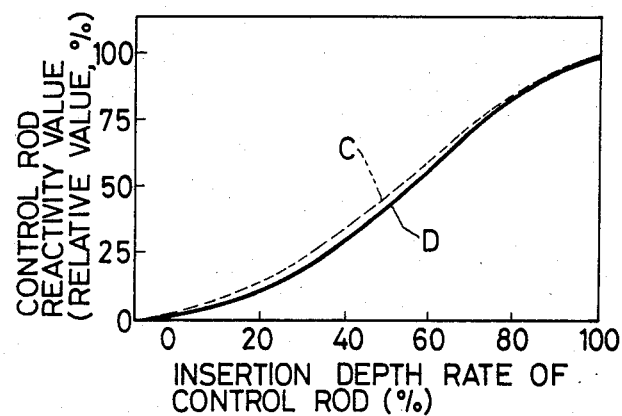
FIG. 12 is a characteristic diagram showing the relationship between the insertion depth ratio of a control rod and the control rod reactivity value.

The change in the maximum power density in the driver core region 50 in the axial direction when the adjusting rods 6A are gradually extracted upward from the driver core region 50 with the safety rods 6B and the backup safety rods 6C being extracted from the driver core region 50 is indicated by a characteristic curve B in FIG. 2. If the adjusting rods 6A are extracted until their insertion depth ratio becomes lower than about 50%, the maximum power density is abruptly reduced. While the insertion depth ratio is within 50 to 100%, the maximum power density is substantially unchanged. In the present embodiment, the peak of the maximum power density is not established within the range of the control rod insertion depth of 40 to 50%, as indicated by the characteristic curve A of the fast breeder as shown in FIG. 1. According to the present embodiment, more specifically, the maximum power density to be attained in the lower portion of the driver core region 50 in case a portion, especially, 40 to 50% of the adjusting rods 6A are inserted into the driver core region 50 can be made lower than that of the fast breeder of FIG. 1. The change in the control rod reactivity value when the adjusting rods 6A of the present embodiment and the control rods 6 acting as the adjusting rods of the fast breeder of FIG. 1 are moved from their complete extractions to their complete insertions is shown in FIG. 12. As has been described hereinbefore, the control rod reactivity values when those rods are fully inserted are equal. The change by the control rods 6 and the change by the adjusting rods 6A are indicated by characteristic curves C and D, respectively. The control reactivity value of the adjusting rods 6A is lower than that of the control rods 6 at the start of the insertion because the concentration of the boron-10 in the lower portion is lower. However, in accordance with the increase in the insertion depth ratio of the adjusting rods 6A, the control rod reactivity value is abruptly raised.

In the present invention, since the safety rods 6B, which have a uniform sectional area of the neutron absorber in the axial direction to that of the control rods 6 as shown in FIG. 1 and which have a higher neutron absorption cross-section absorber at the insertion end side than that of the adjusting rods 6A, the scram can be effected within a short time period. Namely, the change in the control rod reactivity value to the insertion depth ratio of the safety rods 6B is the same as is indicated by the characteristic curve C. At the initial state of insertion of the safety rods 6B into the driver core region 50, therefore, a higher control rod reactivity value than that of the adjusting rods 6A can be realized. According to the present embodiment, the scram can be effected the sooner.

Figure 13:
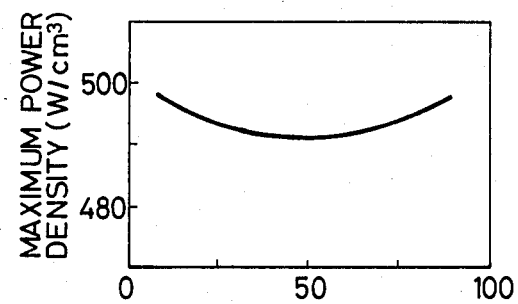
FIG. 13 is a characteristic diagram showing the relationship between the ratio of the length of the region including a high density neutron absorber to the length of all the region including a neutron absorber in the control rod and the maximum power density.

If the position of the boundary between the regions charged with the $B_4C$ pellet 10A and the $B_4C$ pellet 10B in the axial direction is shifted, the reduction ratio of the maximum power density in the axial direction is also changed. FIG. 13 shows the relationship between the position of the boundary between the region charged with the $B_4C$ pellet 10A of higher density and the region charged with the $B_4C$ pellet 10B of lower density and the maximum power density in the axial direction. The abscissa indicates the ratio of the region charged with the $B_4C$ pellet 10A (i.e., the high density neutron absorber charged region) to the neutron absorber charged regions ($R_1$ and $R_2$). As shown the maximum power density is reduced as the region charged with the $B_4C$ pellet 10A is increased more than 0% or decreased less than 100%. In order to effectively reduce the mixmum power density in the axial direction, it is desired that the aforementioned position of the boundary be located such that the region charged with the $B_4C$ pellet 10A occupies 35 to 65%. In other words, this boundary position is arranged to fall within 35 to 65% of the whole length of that charged region from the upper end of the neutron absorber charged regions ($R_1$ and $R_2$). More specifically, the aforementioned boundary position is arranged in the vicinity of such a position that the maximum power density in the axial direction is effected when the control rods 6 having the neutron absorbing substance in a uniform density are inserted.

Figure 14:
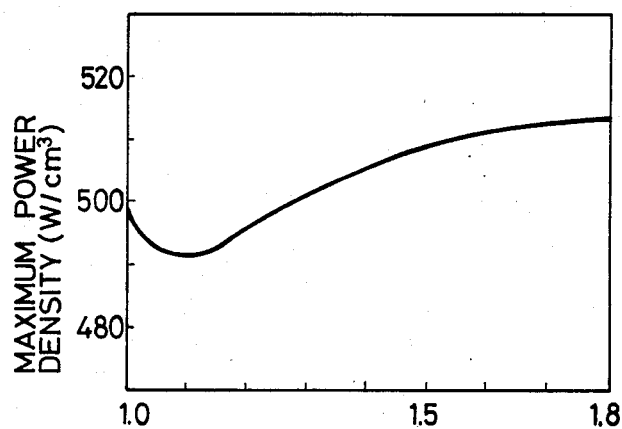
FIG. 14 is a characteristic diagram showing the relationship between the boron-10 density of the more dense $B_4C$ pellet/the boron-density of the less dense $B_4C$ pellet and the maximum power density.

FIG. 14 shows the dependency of the maximum power density upon the density of the neutron absorbing substance. The abscissa indicates (the boron-10 density of the $B_4C$ pellet 10A)/(the boron-10 density of the $B_4C$ pellet 10B). If the boron-10 density of the more dense $B_4C$ pellet to be arranged in the upper portion of the adjusting rod 6A is about 1.03 to 1.17 times higher than the boron-10 density of the less dense $B_4C$ pellet to be arranged in the lower portion of the same, the maximum power density in the axial direction is remarkably reduced. It is desired that the ratio of the boron-10 density in the upper portion of the adjusting rod 6A to the boron-10 density in the lower portion of the same be within the aforementioned range. If the density ratio is made at about 1.1 times, the maximum power density takes its lowest value.

As the safety rod 6B, there may be used a control rod having the same construction as the adjusting rod 6A, i.e., a control rod which has a lower boron-10 concentration in the lower portion than that in the upper portion. In this case, the effects of the aforementioned embodiment can also be achieved. Since the boron-10 concentration in the lower portion of the safety rod 6B is low, however, the time period required for the scram is more or less elongated, as has been described hereinbefore.

Figure 15:
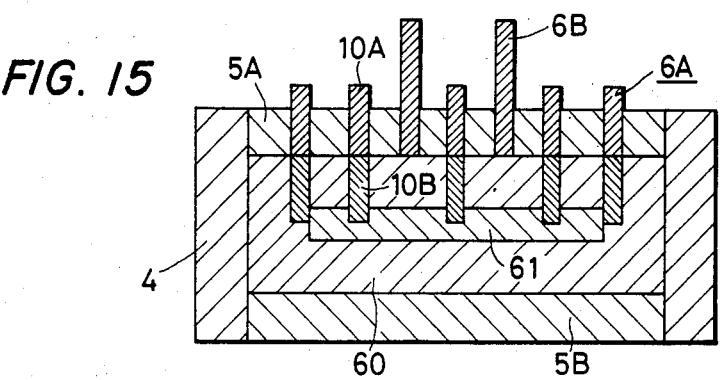
FIGS. 15 and 16 are schematic vertical sectional views showing other embodiments of the present invention.

Another embodiment, in which the present invention is applied to the Parfait core, i.e., an axially heterogeneous core, is shown in FIG. 15. The Parfait core is constructed such that an internal blanket region 61 having the shape of a thin cylinder is arranged within the driver core region 60. This driver core region 60 has its outer periphery surrounded by the radial blanket region 4 and the axial blanket regions 5A and 5B. The adjusting rod 6A, the safety rod 6B and the backup safety rod 6C have the same constructions and arrangements as those of the foregoing embodiment. A fast breeder of an electric power of 2500 MW, to which the Parfait core is applied, has a breeding coefficient of 1.28 and a doubling time of 18.5 years. In the present invention thus constructed, the same effects as those of the embodiment as shown in FIG. 5 can be attained.

Figure 16:
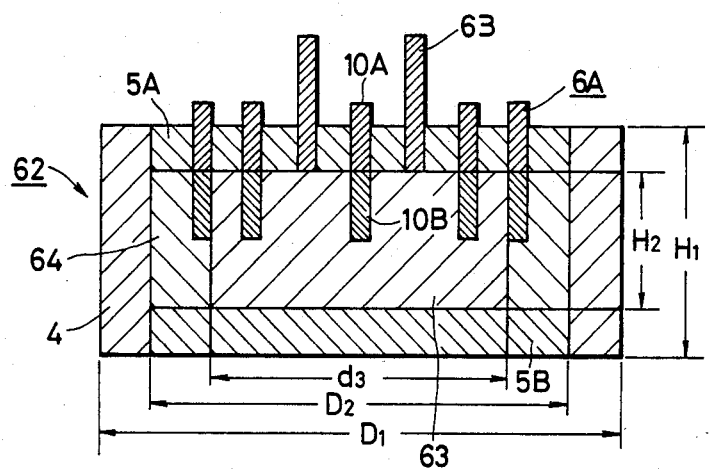

A further embodiment, which is applied to a fast breeder having an axially homogeneous core, will be described with reference to FIG. 16. An axially homogeneous core 62 is formed with internal and external core regions 63 and 64 which are concentrically arranged. The enrichment of the plutonium 239 of the external core region 64 is higher than that of the internal core region 63. The radial blanket region 4 is disposed outside of the external core region 64. The axial blanket regions 5A and 5B are arranged in upper and lower regions of the driver core region, respectively. The sizes of the respective portions of the axially homogeneous core 62 are as follows: $H_1 = 170$ cm; $H_2 = 100$ cm; $D_1 = 405$ cm; $D_2 = 325$ cm; and $d_3 = 243$ cm. In the aforementioned Parfiat core, the sizes $H_1$, $H_2$, $D_1$ and $D_2$ are also the same as those of the axially homogeneous core 62. The adjusting rod 6A, the safety rod 6B and the backup safety rod 6C have the same constructions and arrangements as those of the embodiment as shown in FIG. 5. The axially homogeneous core 62 has a breeding coefficient of 1.26 and a doubling time of 19.0 years.

The power distribution of the axially homogeneous core 62 in the axial direction on the basis of the halfway insertion of the adjusting rod 6A is not highly distorted but resembles the cosine distribution, as has been described hereinbefore. In the present embodiment using the adjusting rod 6A, the increase in the maximum power density is lower about 1% than that of the axially homogeneous core using the control rod 6 having an axially uniform boron-10 density at the time when the adjusting rod 6A is inserted halfway. In the axially homogeneous core, the effects resulting from the use of the adjusting rod 6A are more or less deteriorated than the axially heterogeneous core.

All of adjusting rods, i.e., the control rods used in the foregoing respective embodiments are made to contain two kinds of neutron absorbing substances having different densities in the axial direction. However, the densities of those neutron absorbing substances may be continuously increased from the lower end portion to the upper end portion of the control rods. In this modification, however, multiple kinds of pellets having neutron absorbing sustances of different densities are required so that the production of the absorber rod becomes complex and troublesome. Without changing the densities of the neutron absorbing substances of the same kind, the adjusting rod 6A may be produced by using substances having different neutron absorbing cross-sections such as hafnium or $B_4C$. As is quite natural, in this modification, the substance having the smaller neutron absorbing cross-section such as hafnium is arranged in the lower portion of the adjusting rod 6A, while the substance having the larger neutron absorbing cross-section such as $B_4C$ is arranged in the upper portion of the adjusting rod 6A.

According to the present invention, it is possible to reduce the maximum power density in the axial direction, which is established in the driver core region, especially, in the lower portion thereof when the control rods are partially inserted in the driver core region.

What is claimed is:

1. A fast breeder reactor comprising: a driver core region having a fissile substance enriched and allowing liquid metal acting as a coolant to flow therethrough; an external blanket region surrounding the outer periphery of said driver core region and containing a fertile substance; only one internal blanket region containing a fertile substance and disposed so as to extend horizontally within said driver core region and be surrounded by said driver core region; a control rod made of a neutron absorbing substance and adapted to be inserted downward into said driver core region and through said internal blanket region for adjusting the power of a reactor; a control rod made of a neutron absorbing substance and adapted to be inserted downward into said driver core region for stopping the reactor; a first control rod driver for operating the reactor power adjusting control rod; and a second control rod driver for operating the reactor stopping control rod, wherein a macroscopic neutron absorbing cross-section of a lower portion of said reactor power adjusting control rod is made smaller than a macroscopic neutron absorbing cross-section of an upper portion of the same, the neutron absorbing substance in the upper and lower portions being the same neutron absorbing substance, and the upper and lower portions having different densities of the neutron absorbing substance, and wherein the macroscopic neutron absorbing cross-section of said reactor stopping control rod is made uniform in the axial direction.

2. A fast breeder as set forth in claim 1, wherein the neutron absorbing cross-section of said reactor stopping control rod is made larger than that of the lower portion of the reactor power adjusting control rod.

3. A fast breeder as set forth in claim 1, wherein the boundary position between said upper portion and said lower portion is located within a range of 35 to 65% of the total length of said upper portion and said lower portion from the upper end of said upper portion.

4. A fast breeder as set forth in claim 1 or 3, wherein the neutron absorbing cross-section of said upper portion is 1.03 to 1.17 times as large as that of said lower portion.

5. A fast breeder as set forth in claim 1 or 3, wherein the density of the neutron absorbing substance of said lower portion is made lower than that of said upper portion, and wherein the density of the neutron absorbing substance of said reactor stopping control rod is made uniform in the axial direction.

6. A fast breeder comprising: a driver core region having a fissile substance enriched and allowing a liquid metal acting as a coolant to flow therethrough, an external blanket region surrounding the outer periphery of said driver core region and containing a fertile substance; only one internal blanket region disposed so as to extend horizontally within said diver core region and be surrounded by said driver core region, said internal blanket region containing a fertile substance; and a power adjusting control rod made of a neutron absorbing substance and adapted to be inserted downward into said drive core region and through said internal blanket region, a macroscopic neutron absorbing cross-section of a lower portion of said control rod being made smaller than that of an upper portion of the same, the neutron absorbing substance in the upper and lower portions being the same neutron absorbing substance and the upper and lower portions having different densities of the neutron absorbing substance; and a reactor stopping control rod made of a neutron absorbing substance adapted to be inserted downward into said driver core region.

7. A fast breeder as set forth in claim 6, wherein the boundary position between said upper portion and said lower portion is located within a range of 35 to 65% of the total length of said upper portion and said lower portion from the upper end of said upper portion.

8. A fast breeder as set forth in claim 6 or 7, wherein the neutron absorbing cross-section of said upper portion is 1.03 to 1.17 times as large as that of said lower portion.

9. A fast breeder as set forth in claim 6 or 7, wherein the axial thickness of said internal blanket region is more enlarged at the central portion thereof and less enlarged at the peripheral portion thereof, and wherein the outermost peripheral end of the peripheral portion of said internal blanket region is arranged to face said external blanket region while interposing said driver core region inbetween.

10. A fast breeder as set forth in claim 9, wherein the neutron absorbing cross-section of said upper portion is 1.03 to 1.17 times as large as that of said lower portion.

11. A fast breeder reactor comprising:
a driver core region having a fissile substance enriched and allowing liquid metal acting as a coolant to flow therethrough:
an external blanket region surrounding the outer periphery of thee driver core region and containing a fertile substance;
only one internal blanket region containing a fertile substance disposed so as to extend horizontally within the driver core region and be surrounded by the driver core region; and
control means including neutron absorbing material and arranged for insertion downwardly in the axial direction into the driver core region from an upper part of the driver core region toward a lower part of the driver core region and for at least partial withdrawal from the driver core region for controlling the reactor, the control means including at least one power adjusting control rod means for adjusting reactor power and for suppressing variations in the axial maximum power density at the lower portion of the driver core region when the at least one power adjusting control rod means is partially inserted in the driver core region, the power adjusting control rod means being configured as an elongated rod having an upper portion and a lower portion formed of the same neutron absorbing material for insertion into the driver core region in the axial direction and through the internal blanket region such that upon insertion into the driver core region, the lower portion is the first portion to be inserted into the driver core region, the lower portion of the power adjusting control rod means having a smaller macroscopic neutron absorbing cross-section than the macroscopic neutron absorbing cross-section of the upper portion thereof, the upper and lower portions of the power adjusting control rod means having different densities of the neutron absorbing material, the control means including at least one reactor stopping control rod means for stopping the reactor.

12. A fast breeder reactor according to claim 11, wherein the reactor stopping control rod means is configured as an elongated rod having a portion formed of the neutron absorbing material and arranged for insertion into the driver core region in the axial direction, the neutron absorbing material portion of the power stopping control rod means having a uniform neutron absorbing cross-section in the axial direction thereof.

13. A fast breeder reactor according to claim 11, wherein the upper and lower portions of the power adjusting control rod means are provided with different concentrations by weight % of the neutron absorbing material.

14. A fast breeder reactor according to claim 11, wherein the neutron absorbing material in the power adjusting control rod means is boron-10.

15. A fast breeder reactor according to claim 14, wherein the concentration of boron-10 by weight % in the upper portion is greater than the concentration in the lower portion.

16. A fast breeder reactor according to claim 11 or 12, wherein the boundary position between the upper portion and the lower portion is located within a range of 35 to 65% of the total length of the upper portion and the lower portion from the upper end of the upper portion.

17. A fast breeder reactor according to claim 11 or 12, wherein the upper portion has a neutron absorbing cross-section 1.03 to 1.17 times as large as the lower portion.

18. A fast breeder reactor according to claim 11, wherein the density of the neutron absorbing material of the upper portion is greater than the density of the neutron absorbing material of the lower portion.

19. A fast breeder reactor according to claim 12, wherein the neutron absorbing cross-section of the reactor stopping control rod means is greater than the neutron absorbing cross-section of the lower portion of the power adjusting control rod means.

20. A fast breeder reactor according to claim 11 or 12, wherein the power adjusting control means reduce the axial maximum power density obtained when the control rod means is at least partially inserted into the drive core region.

21. A fast breeder as set forth in claim 1, wherein said internal blanket region has an axial thickness greater at the central portion thereof than at the peripheral portion thereof, and said driver core region being disposed between the outermost peripheral end of the peripheral portion and said external blanket region facing the outermost peripheral end of the peripheral portion of said internal blanket region so as to provide an axially heterogeneous core.

22. A fast breeder as set forth in claim 6, wherein said internal blanket region has an axial thickness greater at the central portion thereof than at the peripheral portion thereof, and said driver core region being disposed between the outermost peripheral end of the peripheral portion and said external blanket region facing the outermost peripheral end of the peripheral portion of said internal blanket region so as to provide an axially heterogeneous core.

23. A fast breeder as set forth in claim 11, wherein the internal blanket region has an axial thickness greater at the central portion thereof than at the peripheral portion thereof, and the driver core region being disposed between the outermost peripheral end of the peripheral portion and the external blanket region facing the outermost peripheral end of the peripheral portion of the internal blanket region so as to provide an axially heterogeneous core.

* * * * *